(No Model.)

J. C. FORAKER.
FLOUR AND MEAL CHEST.

No. 554,219.  Patented Feb. 4, 1896.

Witnesses.
A. Ruppert
G. B. Towles

Inventor.
John C. Foraker
Per
Thomas P. Simpson
Atty

UNITED STATES PATENT OFFICE.

JOHN C. FORAKER, OF CHERRYVALE, KANSAS.

FLOUR AND MEAL CHEST.

SPECIFICATION forming part of Letters Patent No. 554,219, dated February 4, 1896.

Application filed June 19, 1895. Serial No. 553,275. (No model.)

*To all whom it may concern:*

Be it known that I, JOHN C. FORAKER, a citizen of the United States, residing at Cherryvale, in the county of Montgomery and State of Kansas, have invented certain new and useful Improvements in Flour and Meal Chests; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to kitchen cabinets or chests in which flour and cornmeal may be conveniently kept without heating, getting musty, or being exposed to the depredation of mice or insects; also from which nicely-sifted flour or meal may always be obtained without delay.

Figure 1:
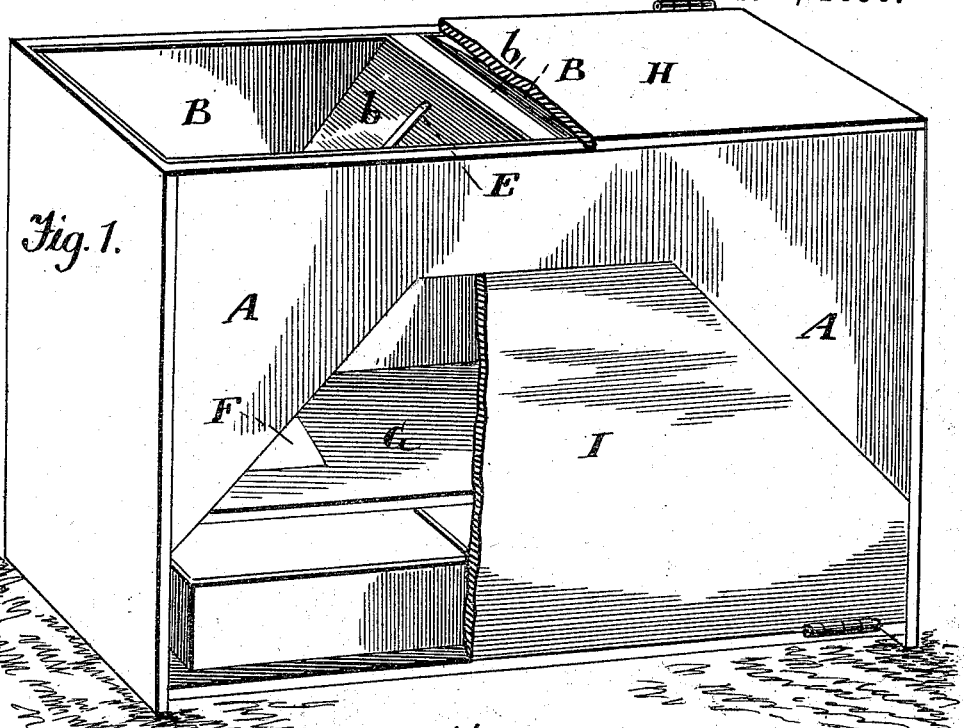
Figure 2:
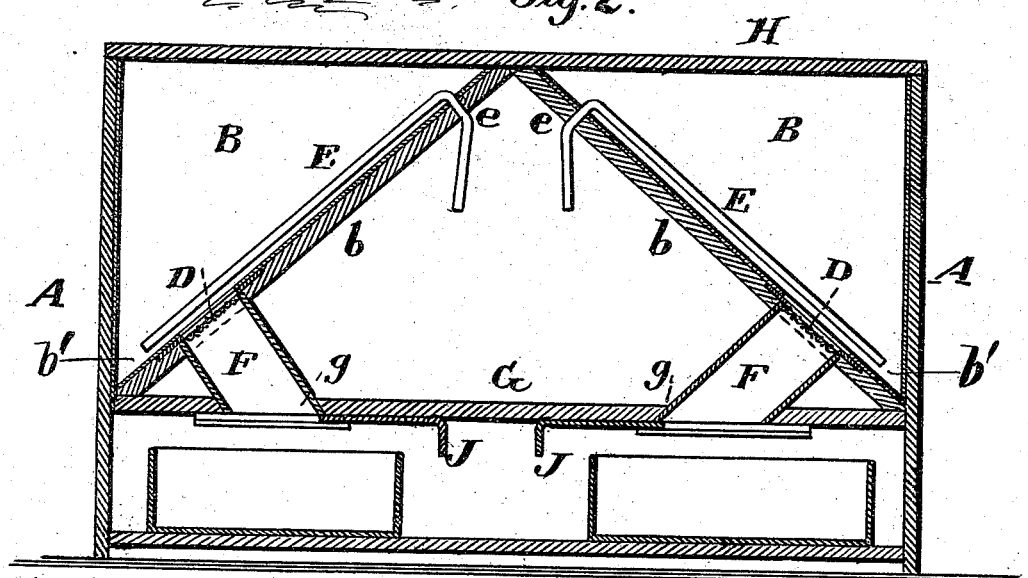

Figure 1 of the drawings is a perspective view of my flour and meal chest, and Fig. 2 a longitudinal vertical section thereof.

In the drawings, A represents the chest, and B B two bins, one for flour and the other for meal, the two being provided with oppositely-inclined bottoms $b\ b$. These bins are preferably zinc-lined and have each a sieve D, which may be made of wire mesh and secured so as to be easily removed and replaced.

E is an agitator or vibratory rod pivoted by means of an end, turned at a right angle, to serve as a pivot, as shown at $e$. This rod is so arranged that it may be easily moved by hand over the upper face of the sieve to cause the flour or meal to move freely through it, then down through the chute F into the receptacle thereunder.

G is a false bottom having the holes $g\ g$ through which the chutes are held snugly in place, and on which, as well as on the true bottom, may be kept any household conveniences not calculated to injure the flour or meal.

H is a hinged closely-fitting cover, adapted to prevent the ingress of depredators and to allow the introduction of flour or meal to the bins.

I is a lower front door which is hinged to open when the sifted flour or meal is wanted.

Both the cover H and door I may be provided with locks, if deemed necessary, while a drawer or pan is kept under each chute whenever the slide-valve J is open. Just before withdrawing said pan, drawer, or other receptacle the valve is closed so as to stop the flow until the pan is returned. The movement of the flour or meal at such times causes it to be aerated and kept in a sound healthy condition.

By my construction the sieves are near but not at the bottom of the inclines $b\ b$, the receptacles $b'\ b'$ below the sieves being adapted to receive foreign substances, which might otherwise be mashed and be made to pass through the sieve with the flour or meal.

The size of the chest will of course correspond with the average number of persons who constitute the family.

Having thus described all that is necessary to a full understanding of my invention, what I claim as new, and desire to protect by Letters Patent, is—

A flour and meal chest having the two bins B B with oppositely-inclined floors $b\ b$, the wire-mesh sieves D D arranged on the inclines to leave the receptacles $b'\ b'$ below them, and the chutes F F provided with the slide-valves J; all combined and arranged as shown and described.

In testimony whereof I affix my signature in presence of two witnesses.

JOHN C. FORAKER.

Witnesses:
 H. F. TAYLOR,
 M. F. TAYLOR.